(12) United States Patent
Lin et al.

(10) Patent No.: US 12,386,490 B2
(45) Date of Patent: Aug. 12, 2025

(54) TASK TRACK INFORMATION PROCESSING METHOD AND APPARATUS, TERMINAL, AND STORAGE MEDIUM

(71) Applicant: BEIJING ZITIAO NETWORK TECHNOLOGY CO., LTD., Beijing (CN)

(72) Inventors: Yiyuan Lin, Beijing (CN); Yuanye Wu, Beijing (CN); Jian Sun, Beijing (CN); Yifei Xue, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/271,828

(22) PCT Filed: Jan. 12, 2022

(86) PCT No.: PCT/CN2022/071578
§ 371 (c)(1),
(2) Date: Jul. 11, 2023

(87) PCT Pub. No.: WO2022/152162
PCT Pub. Date: Jul. 21, 2022

(65) Prior Publication Data
US 2024/0086045 A1    Mar. 14, 2024

(30) Foreign Application Priority Data
Jan. 13, 2021  (CN) .......................... 202110041902.X (51) Int. Cl.
*G06F 3/048* (2013.01)
*G06F 3/0481* (2022.01)
*G06F 3/04842* (2022.01)

(52) U.S. Cl.
CPC ........ *G06F 3/04842* (2013.01); *G06F 3/0481* (2013.01)

(58) Field of Classification Search
CPC .......................... G06F 3/04842; G06F 3/0481
See application file for complete search history.

(56) References Cited

U.S. PATENT DOCUMENTS

| 8,949,275 | B1* | 2/2015 | Aasuri-Maringanti ..................... G06F 16/34 707/791 |
| 2007/0198977 | A1* | 8/2007 | Abernethy ............. G06Q 10/10 718/100 |

(Continued)

FOREIGN PATENT DOCUMENTS

| CN | 104392310 A | 3/2015 |
| CN | 104461239 A | 3/2015 |

(Continued)

OTHER PUBLICATIONS

International Patent Application No. PCT/CN2022/071578; Int'l Search Report; dated Mar. 22, 2022; 3 pages.

(Continued)

*Primary Examiner* — Mahelet Shiberou
(74) *Attorney, Agent, or Firm* — BakerHostetler (57) ABSTRACT

The present disclosure provides an information processing method and apparatus, a terminal, and a storage medium. The information processing method comprises: receiving first task information at an instant messaging client, and displaying the first task information in a first category interface of a task interface of the instant messaging client; and in response to a preset operation of the first task information, displaying second task information in a second category interface of the task interface of the instant messaging client, wherein executors of the first task information and the second task information are different. The present (Continued)

disclosure classifies tasks more accurately and facilitates the tracking and management of the tasks.

19 Claims, 8 Drawing Sheets

(56) References Cited

U.S. PATENT DOCUMENTS

| | | | | |
|---|---|---|---|---|
| 2008/0155042 | A1* | 6/2008 | Heinle | G06Q 10/10 |
| | | | | 709/206 |
| 2011/0131285 | A1 | 6/2011 | Liao et al. | |
| 2016/0034844 | A1 | 2/2016 | Kofman | |
| 2018/0152407 | A1* | 5/2018 | Soni | H04L 51/18 |
| 2022/0027834 | A1* | 1/2022 | Zheng | G06Q 50/01 |
| 2023/0092507 | A1* | 3/2023 | Kakumanu | H04L 51/214 |
| | | | | 709/206 |
| 2023/0177421 | A1* | 6/2023 | Mouawad | G06Q 10/0639 |
| | | | | 705/7.42 |

FOREIGN PATENT DOCUMENTS

| | | |
|---|---|---|
| CN | 104462304 A | 3/2015 |
| CN | 106651073 A | 5/2017 |
| CN | 107368995 A | 11/2017 |
| CN | 108197904 A | 6/2018 |
| CN | 110581794 A | 12/2019 |
| CN | 114764282 B | 11/2024 |

OTHER PUBLICATIONS

How do you use DING ?; https://www.bilibili.com/video/av89537536/; Bilibili; Feb. 2020; accessed Jul. 11, 2023; 4 pages.
Alibaba Cloud "Subtasks"; https://help.aliyun.com/document_detail/167673.html; May 2020; no original document, website error. (English Abstract Only).
"DING"; https://www.bilibili.com/video/BV117411E7A8/?spm_id_from=333.337.search-card.all.click&vd_source=6167795e1b5e919bae8fe0a25559316f; Bilibili; Feb. 2020; accessed Oct. 11, 2023; 3 pages (contains English Abstract).
"Subtasks"; https://help.aliyun.com/document_detail/153506.html; Aliyun; Apr. 2020; accessed Oct. 11, 2023; 3 pages (contains English Abstract).
"Technology empowers everything to be clear, making the big data of "equipment full cycle management" visible to enterprises"; https://ex.chinadaily.com.cn/exchange/partners/82/rss/channel/cn/columns/snl9a7/stories/WS5e982e7ea310c00b73c77971.html; China Daily; Apr. 2020; accessed Sep. 10, 2024; (also contains English Abstract) 15 pages.
Written Opinion for International Application No. PCT/CN2022/071578, mailed Mar. 22, 2022, 07 Pages.
Notification to Grant Patent Right for Invention for Chinese Application No. 202110041902.X, mailed Oct. 10, 2024, 6 pages.

* cited by examiner

Fig. 8

TASK TRACK INFORMATION PROCESSING METHOD AND APPARATUS, TERMINAL, AND STORAGE MEDIUM

CROSS REFERENCE TO RELATED APPLICATIONS

The present application is the U.S. National Stage of International Application No. PCT/CN2022/071578, titled "INFORMATION PROCESSING METHOD AND APPARATUS, TERMINAL, AND STORAGE MEDIUM", filed on Jan. 12, 2022, which claims priority to Chinese Patent Application No. 202110041902.X, filed on Jan. 13, 2021, and entitled "INFORMATION PROCESSING METHOD AND APPARATUS, TERMINAL, AND STORAGE MEDIUM", the entire contents of both of which are incorporated herein by reference.

FIELD

The present disclosure relates to the field of information technology, and particularly to an information processing method and apparatus, a terminal and a storage medium.

BACKGROUND

With the development of Internet technology, instant messaging applications are used not only in ordinary social activities, but also increasingly in various scenarios such as work.

SUMMARY

To solve the existing problems, the present disclosure provides an information processing method and apparatus, a terminal and a storage medium.

An embodiment of the present disclosure provides an information processing method, the information processing method comprises: receiving first task information at an instant messaging client, displaying the first task information in a first category interface of a task interface of the instant messaging client; and displaying second task information in a second category interface of the task interface of the instant messaging client in response to a preset operation on the first task information, wherein performers of the first task information and the second task information are different.

Another embodiment of the present disclosure provides an information processing method, the information processing method comprises: receiving first task information at an instant messaging client, displaying the first task information in a task interface of the instant messaging client; and displaying second task information in the task interface of the instant messaging client in response to a preset operation on the first task information, wherein performers of the first task information and the second task information are different, and the second task information includes a performer of a corresponding task and a performer of related task information derived from the second task information.

Another embodiment of the present disclosure provides an information processing method, the information processing method comprises: receiving first task information; and generating second task information in response to a preset operation on the first task information; wherein the second task information includes a performer of the first task information, a performer of the second task information, and a performer of related task information derived from the second task information, arranged in a preset order, and excludes a creator of the first task information.

Another embodiment of the present disclosure provides an information processing apparatus, the information processing apparatus comprises: a first category interface module configured to receive first task information at an instant messaging client and display the first task information in a first category interface of a task interface of the instant messaging client; and a second category interface module configured to display second task information in a second category interface of the task interface of the instant messaging client in response to a preset operation on the first task information, wherein performers of the first task information and the second task information are different.

Some embodiments of the present disclosure provide a terminal device, the terminal device comprising: at least one memory and at least one processor; wherein the at least one memory is configured to store program code, and the at least one processor is configured to call the program code stored by the at least one memory to perform the above information processing method.

Some embodiments of the present disclosure provide a storage medium for storing program code, wherein the program code, when executed by a processor, cause the processor to perform the above information processing method.

The present disclosure adopts the following technical solutions. The embodiments of the present disclosure facilitate tracking of tasks by displaying second task information in a second category interface of a task interface of an instant messaging client in response to a preset operation on the first task information, wherein performers of the first task information and the second task information are different, the tasks are classified more accurately.

BRIEF DESCRIPTION OF THE DRAWINGS

These and other features, advantages and aspects of embodiments of the present disclosure will become more apparent in conjunction with the drawings and with reference to the following specific embodiments. Throughout the drawings, identical or similar appended marks indicate identical or similar elements. It should be understood that the drawings are schematic and that the elements and components are not necessarily drawn to scale.

DETAILED DESCRIPTION OF THE EMBODIMENTS

Embodiments of the present disclosure will be described in greater detail below with reference to the drawings. While certain embodiments of the present disclosure are shown in the drawings, it should be understood that the present disclosure may be implemented in various forms and should not be construed as being limited to the embodiments set forth herein, but instead are provided for a more thorough and complete understanding of the present disclosure. It should be understood that the drawings and embodiments of the present disclosure are for exemplary purposes only and are not intended to limit the scope of protection of the present disclosure.

It should be understood that the steps documented in the device embodiments of the present disclosure may be performed in a different order, and/or in parallel. In addition, the device embodiments may include additional steps and/or omit to perform the steps shown. The scope of the present disclosure is not limited in this regard.

The term "includes" and variations thereof as used herein are open-ended, i.e., "includes but is not limited to". The term "based on" is "based, at least in part, on". The term "an embodiment" means "at least one embodiment"; the term "another embodiment" means "at least one additional embodiment"; the term "some embodiment" indicates "at least some embodiments". The term "responsive to" and related terms refer to a signal or event being affected to some degree by another signal or event, but not necessarily completely or directly. If event x occurs "in response to" event y, then x may respond directly or indirectly to y. For example, the presence of y may eventually lead to the presence of x, but there may be other intermediate events and/or conditions. In other cases, y may not necessarily lead to the occurrence of x, and x may occur even though y has not yet occurred. In addition, the term "responsive to" may also mean "at least partially responsive to". The term "determine" broadly covers a wide variety of actions and may include calculating, computing, processing, deriving, investigating, finding (e.g., looking in a table, database, or other data structure), probing, and the like, and may include receiving (e.g., receiving information), accessing (e.g., accessing data in memory), and the like, and parsing, selecting, picking, building, and similar actions, and the like. Related definitions of other terms will be given in the description below. Related definitions of other terms are given in the descriptions below.

It should be noted that the concepts of "first" and "second" mentioned in this disclosure are used only to distinguish between different devices, modules or units, and are not intended to define the order or interdependence of the functions performed by these devices, modules or units.

It should be noted that the modifications of "one" and "more than one" referred to in this disclosure are illustrative rather than limiting, and it should be understood by those skilled in the art to mean "one or more" unless the context clearly indicates otherwise.

For the purposes of this disclosure, the phrase "A and/or B" means (A), (B), or (A and B).

The names of the messages or information interacted between the plurality of devices in this implementation of the disclosure are used for illustrative purposes only and are not intended to limit the scope of those messages or information.

Figure 1:
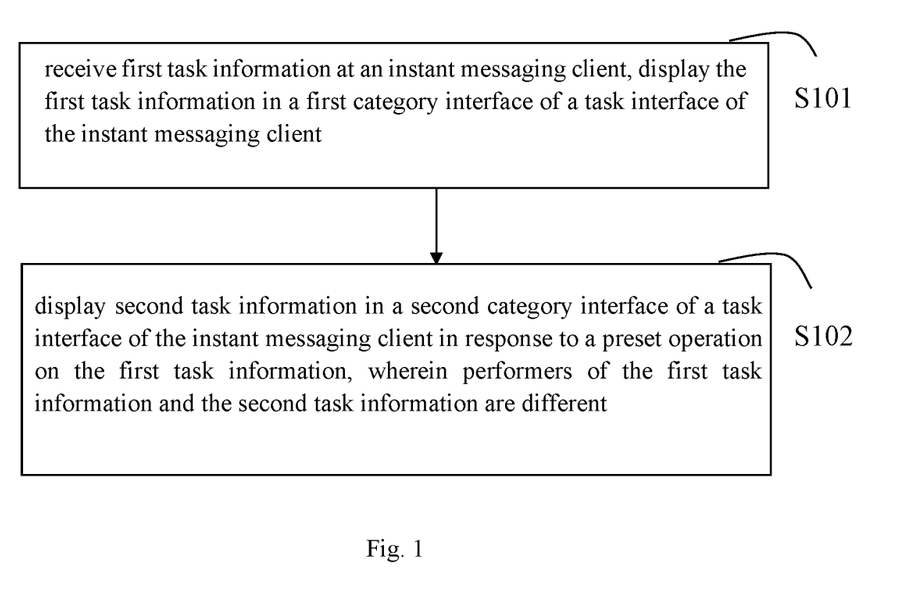
FIG. 1 is a flowchart of an information processing method of some embodiments of the present disclosure.

FIG. 1 provides a flowchart of an information processing method of an embodiment of the present disclosure. An information processing method of the present disclosure may include step S101: first task information is received at an instant messaging client, the first task information is displayed in a first category interface of a task interface of the instant messaging client. In some embodiments, the instant messaging client may be a client of any suitable instant messaging application with which a user may engage in instant messaging. In some embodiments, to-do items or task settings may be made in the instant messaging client, so that the corresponding instant messaging application may be applied to work or game application scenarios. In some embodiments, the first task information may be received at the instant messaging client and displayed in a first category interface of a task interface of the instant messaging client.

Figure 2:
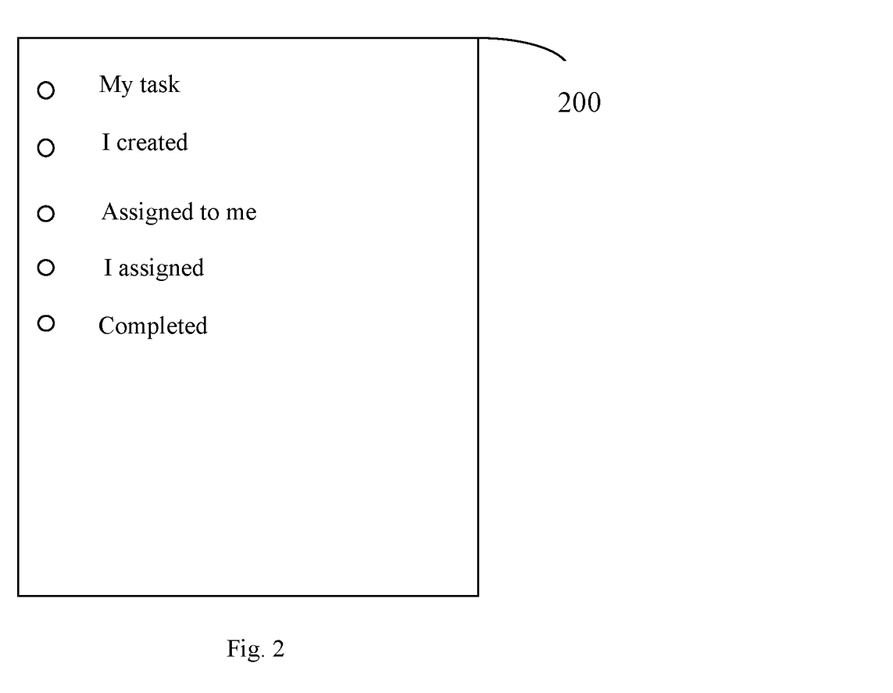
FIG. 2 is a schematic diagram of a task interface of some embodiments of the present disclosure.
Figure 3:
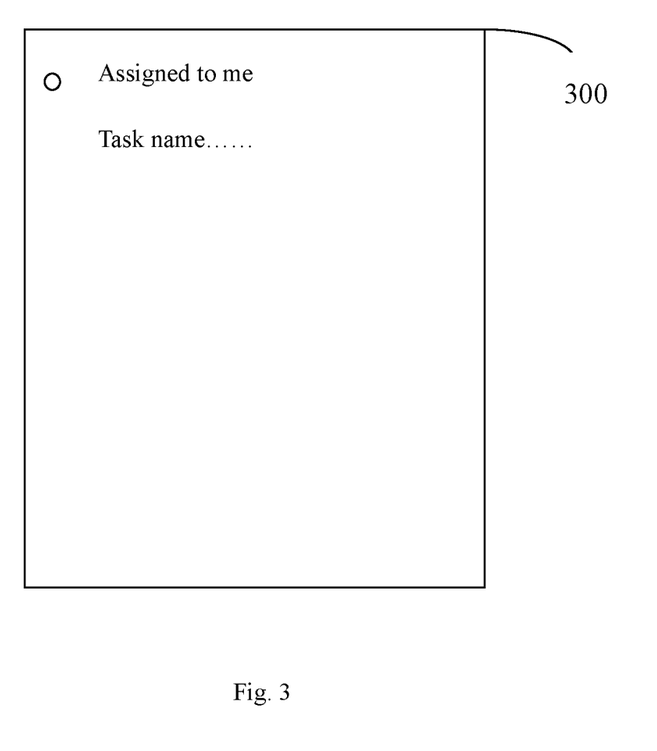
FIG. 3 is a schematic diagram of a first category interface of a task interface of some embodiments of the present disclosure.

The following exemplary description is made in conjunction with FIGS. 2 and 3 which should be understood to be exemplary only and not intended to limit the present disclosure. FIGS. 2 and 3 respectively show a task interface 200 of an instant messaging client and a first category interface 300 of the task interface 200 of some embodiments of the present disclosure. It should be understood that the classification of the task interface 200 in FIG. 2 is exemplary only and is not used to limit the present disclosure. In some embodiments, the instant messaging client receives the first task information and displays the first task information in the first category interface 300 of the task interface 200. In some embodiments, only the task name or beginning content of the first task information may be displayed in the first category interface 300. In some embodiments, the first category may be "assigned to me" and/or "I created", it should be understood that this is exemplary only, and the first category may also be other suitable classified items.

Figure 4:
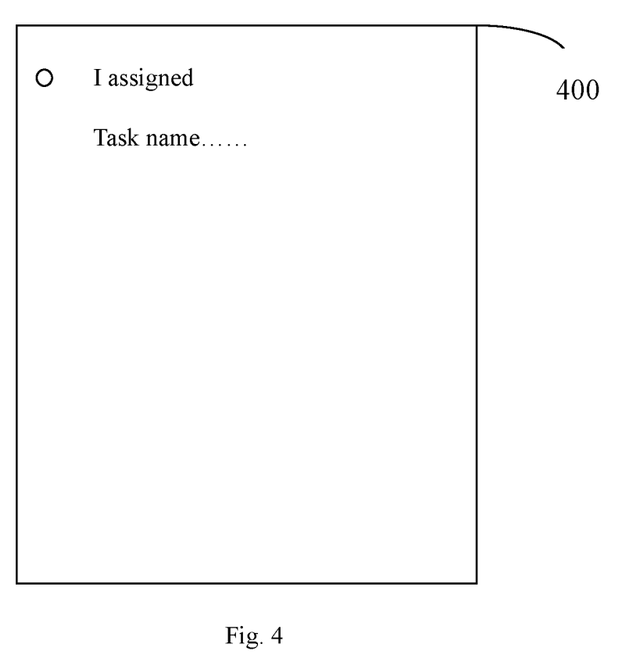
FIG. 4 is a schematic diagram of a second category interface of a task interface of some embodiments of the present disclosure.
Figure 5:
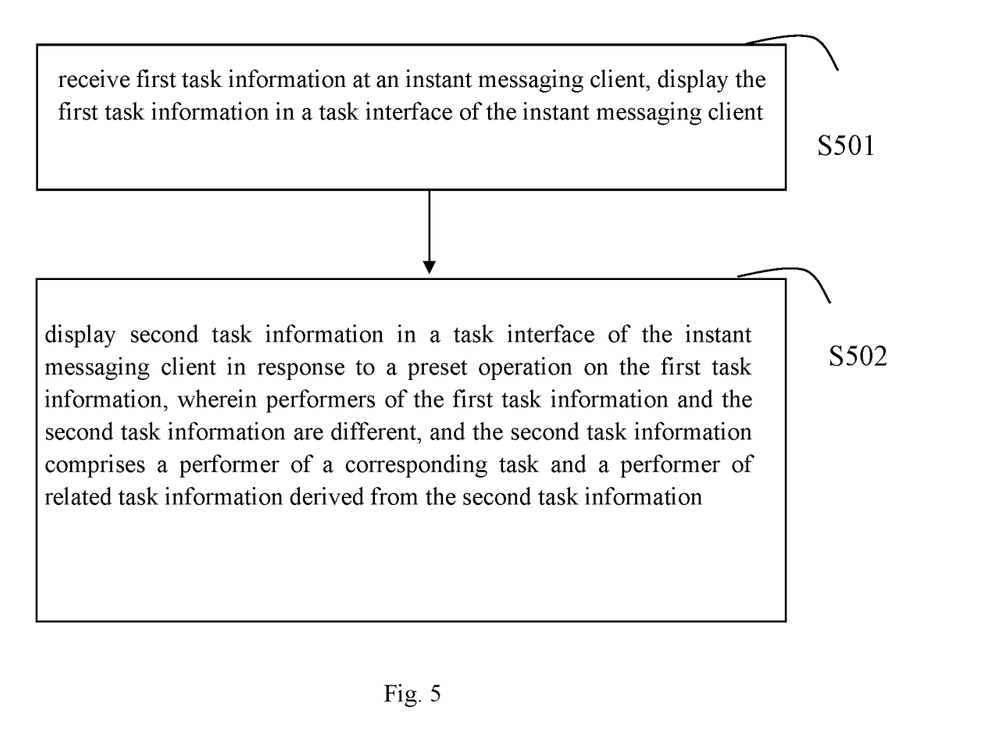
FIG. 5 is a flowchart of an information processing method of another embodiment of the present disclosure.

In some embodiments, the method of the present disclosure may further include step S102: second task information is displayed in a second category interface of a task interface of the instant messaging client in response to a preset operation on the first task information, wherein performers of the first task information and the second task information are different. In some embodiments, the preset operation can be any suitable operation that causes a preset field of a task (e.g., a performer) to change, e.g., an operation that assigns a task. For example, the performer shown in the first task information is B, and after B assigns the task to C, the performer changes to C. In some embodiments, the second task information is displayed in the second category interface 400 of the task interface 200 of the instant messaging client in response to a preset operation on the first task information. It should be understood that the classification nomenclature in FIGS. 2-4 is merely exemplary and is not used to limit the present disclosure. In some embodiments, the second category is "I assigned", it should be understood that this is examplary only, and the second category may also be other suitable classified items.

The embodiments of the present disclosure facilitate tracking of tasks by displaying second task information in a second category interface of a task interface of an instant messaging client in response to a preset operation on the first task information, wherein performers of the first task information and the second task information are different, the tasks are classified more accurately. Additionally, in some cases, tasks may be distributed layer by layer, and in the existing classification of tasks, such tasks are not well classified, and the method of the present disclosure solves this problem well by providing such a second category interface, which allows such tasks distributed layer by layer to be well classified, tracked and managed.

In some embodiments, the log-in user of the instant messaging client is a performer of a task to be performed in the first task information displayed in the first category interface. In some embodiments, the log-in user of the instant messaging client is a distributor of a task to be performed in the second task information displayed in the second category interface.

In some embodiments, after displaying second task information in a second category interface of a task interface of the instant messaging client, the first task information is no longer displayed in the first category interface. In some embodiments, the first task information is no longer displayed in the first category interface after the performer of the task has changed. Since the task described by the first task information has been changed to the task described by the second task information at this time, the task described by the first task information has not been performed. Thereby, the classification and display of tasks is made more streamlined, while the reminding function of the corresponding task is not affected. In some embodiments, after displaying the second task information in the second category interface of the task interface of the instant messaging client, the first task information is still displayed in the first category interface.

In some embodiments, the preset operation includes an operation of causing content of a preset field of the first task information to be changed. In some embodiments, the preset field includes, but is not limited to, a performer. In some embodiments, the preset field may include at least one of a performer, an expiration time, note content, a priority level, and a participant. For example, the performer shown in the first task information is B, after B assigns this task to C, the performer changes to C, when B assigns the task to C, B may modify the content of other preset fields (e.g., the expiration time, note content, priority level, participant, etc.) in addition to the performer, so that the content of the corresponding preset field in the generated second task information is correspondingly different from the first task information.

In some embodiments, in response to the preset operation on the first task information, displaying the second task information in the second category interface of the task interface of the instant messaging client includes: based on user information performing the preset operation, determining content of a preset field of the second task information. For example, in some embodiments, the performer displayed in the first task information is B, after B assigns the task to C, the performer changes to C, the user of the preset operation at this time is B, and based on the information of the user B, the content of the preset field of the second task information is determined. In some embodiments, the content of the preset field in the second task information shows that the task is assigned by B to C. Further, when C assigns the task to D to generate the third task information, based on the information of the user C, the content of a preset field in the third task information is determined, the content of the preset field in the third task information showing that the task is assigned to D by C.

In some embodiments, when a user performing a preset operation makes a change to a preset field of the first task information, the preset field of the generated second task information is correspondingly changed, for example, when the expiration time of the task is changed by the user performing the preset operation, the expiration time of the generated second task information is correspondingly changed with respect to the first task information.

In some embodiments, displaying the first task information in the first category interface of the task interface of the instant messaging client includes displaying a preset field of the first task information in a sub-interface of the first category interface. In some embodiments, the sub-interface of the first category interface may be accessed through a preset entry (e.g., clicking on a preset location in the first category interface) in the first category interface. In some embodiments, only the task name or beginning content of the first task information may be displayed in the first category interface 300. In some embodiments, a preset field of the first task information is displayed in a sub-interface of the first category interface 300. In this way, through the gradual setting of information, the task content can be displayed more methodically, and the user can be guided more accurately.

In some embodiments, displaying the second task information in the second category interface of the task interface of the instant messaging client includes displaying a preset field of the second task information in a sub-interface of the second category interface. In some embodiments, only the task name or the beginning content of the second task information may be displayed in the second category interface 400. In some embodiments, a preset field of the second task information is displayed in a sub-interface of the second category interface 400. In this way, through the gradual setting of information, the task content can be displayed more methodically, and the user can be guided more accurately.

In some embodiments, the second task information includes a creator of the first task information, a creator of the second task information, and a performer of the second task information. For example, if the creator of the first task information is X, X assigns the task to Y, the performer of the first task information is Y, after Y assigns the task to Z to generate the second task information, the creator of the second task information is Y, and the performer of the second task information is Z. As such, the second task information shows users X, Y, and Z. In some embodiments, the second task information includes a creator of the first task information, a creator of the second task information, and a performer of the second task information in chronological order. In some embodiments, since the second task information is derived due to a preset operation on the first task information, by making the second task information include the creator of the first task information, the creator of the second task information and the performer of the second task information, arranged in a preset order (e.g., chronological order, organizational architecture order, etc.), the creation and execution history of the corresponding tasks can be fully presented, and the tracking management of the tasks is more convenient. In some embodiments, it is assumed that the creator of the first task information is X, the performer of the first task information is Y, and then Y assigns the task to Z to generate the second task information, i.e., the creator of the second task information is Y, and the performer is Z. Thus, X, Y, Z involved in the creation and execution history are presented in time series, which is more convenient for tracking and managing tasks.

In some embodiments, the second task information further includes a performer of related task information derived from the second task information. In some embodiments, the performer Z of the second task information can also assign the corresponding task to W to generate the third task information, and by making the second task information include the performer of the related task information derived from the second task information, detailed performances of the tasks once assigned by the user can be presented, thereby facilitating tracking management of the tasks.

In some embodiments, for a task that a user has assigned, it is possible to track all of the execution processes after the user's assignment, but only the last assignment process that assigned the task to the user before the user's assignment, and not the more previous steps. For example, it is assumed that the assigned execution of a task is X-Y-Z-W-V, for Z, the second task information may include an execution procedure Y-Z-W-V of the corresponding task, while is not traceable from X to Y, in general, in a work scenario, a task is assigned by an upper level to a next level, by enabling a user to track only to the upper level and not to the level higher than the upper level, the decision privacy of the upper supervisor can be protected while also maximizing the tracking management of tasks.

In some embodiments, since the second task information is generated by a preset operation on the basis of the first task information, the second task information may be referred to as being derived from the first task. If the third task information is generated after the second task information is subjected to a preset operation of the corresponding user, the third task information may be considered to be derived from the second task information, and the third task information may also be considered to be derived from the first task information. In some embodiments, each time a task is assigned, it may be reported to the upper level assignor, e.g., embodied in the content of a preset field of the assignor. In some embodiments, progressive reporting or reporting may be employed, for example, if the corresponding task is performed Y-Z-W-V, then when W assigns a task to V, an assignment report is sent to Z indicating that W assigns a task to V. After Z's client receives the corresponding report, corresponding information or notes may be added at the preset field of the corresponding task information, to enable the user Z to learn that the task has been assigned to V by W when viewing the corresponding task information. Accordingly, the client of the user Z, after receiving the corresponding report content, sends a corresponding report to the client of the upper level assigner Y, such that it is shown in Y's corresponding task information that the performer of the task has been changed from W to V. It should be understood that the manner of progressive reporting or reporting is merely exemplary and not intended to limit the present disclosure, and other suitable manners may be employed.

An embodiment of the present disclosure further provides an information processing method, including step S501: first task information is received at an instant messaging client, the first task information id displayed in a task interface of the instant messaging client. In some embodiments, the instant messaging client may be a client of any suitable instant messaging application with which a user may engage in instant messaging. In some embodiments, to-do items or task settings may be made in the instant messaging client, so that the corresponding instant messaging application may be applied to work or game application scenarios. In some embodiments, the first task information may be received at the instant messaging client and displayed in a task interface of the instant messaging client.

In some embodiments, the information processing method of the present disclosure may further include step S502: in response to a preset operation on the first task information, second task information is displayed in a task interface of the instant messaging client, wherein performers of the first task information and the second task information are different. In some embodiments, the preset operation can be any suitable operation that causes the performer of the task to change. In some embodiments, the preset operation causes the content of the preset fields of the first task information and the second task information to change in addition to the performer.

In some embodiments, since the second task information is generated by a preset operation on the basis of the first task information, the second task information may be referred to as being derived from the first task. If the third task information is generated after the second task information is subjected to a preset operation of the corresponding user, the third task information may be considered to be derived from the second task information, and the third task information may also be considered to be derived from the first task information. In some embodiments, each time a task is assigned, it may be reported to the upper level assignor, e.g., embodied in the contents of a preset field of the assignor. In some embodiments, progressive reporting or reporting may be employed, for example, if the corresponding task is performed Y-Z-W-V, then when W assigns a task to V, an assignment report is sent to Z indicating that W assigns a task to V. After Z's client receives the corresponding report, corresponding information or notes may be added at the preset field of the corresponding task information, to enable the user Z to learn that the task has been assigned to V by W when viewing the corresponding task information. Accordingly, the client of the user Z, after receiving the corresponding report content, sends a corresponding report to the client of the upper level assigner Y, such that it is shown in Y's corresponding task information that the performer of the task has been changed from W to V. It should be understood that the manner of progressive reporting or reporting is merely exemplary and not intended to limit the present disclosure, and other suitable manners may be employed. In some embodiments, the second task information includes the performer of the corresponding task and the performer of related task information derived from the second task information. For example, a preset field of a corresponding task of the user Z may display a performer variation process Y-Z-W-V of the corresponding task.

In some cases, tasks may be distributed layer by layer, whereas such tasks are not well classified in the existing task classification, the method of the present disclosure solves this problem well by displaying the time-varying performers of the corresponding tasks in the second task information, so that such tasks which are distributed layer by layer can be well classified, tracked and managed.

In some embodiments, the corresponding preset field of the task information can be traced back to the assigner of the previous level, e.g., the performer variation process Z-W-V of the corresponding task can be displayed in the corresponding task information of the client of the user W, but the assignment processes from Y to Z cannot be displayed. In general, in a work scenario, the task is assigned by the upper level to the next level, and by enabling the user to trace only to the upper level but not to the level higher than the upper level, information leakage can be avoided while also maximizing the tracking management of the task.

Figure 6:
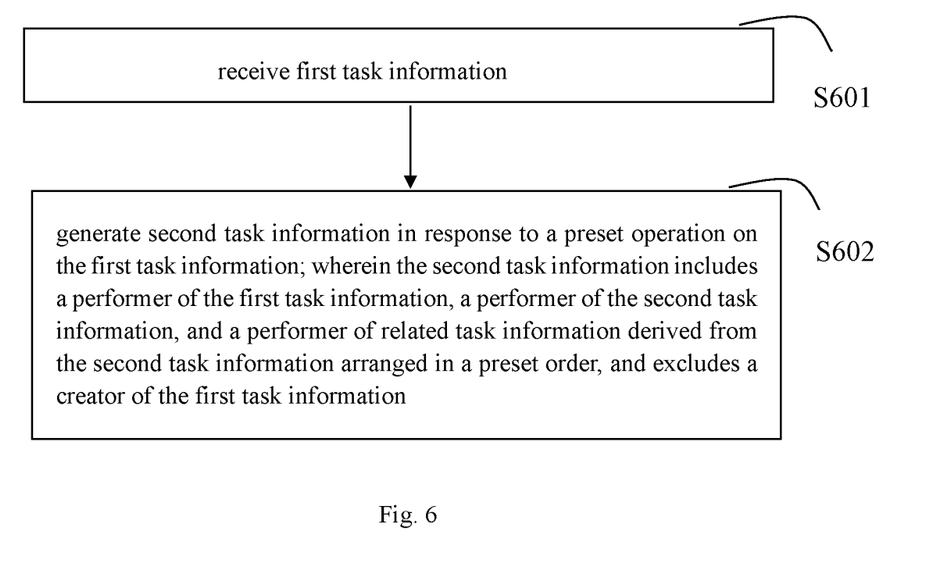
FIG. 6 is a flowchart of an information processing method of another embodiment of the present disclosure.

As shown in FIG. 6, an embodiment of the present disclosure provides an information processing method, including step S601: first task information is received. The information processing method further includes a step S602: second task information is generated in response to a preset operation on the first task information. In some embodiments, the preset operation includes an operation of changing content of a preset field (e.g., a performer) of the first task information. In some embodiments, the second task information includes the performer of the first task information, the performer of the second task information, and the performer of related task information derived from the second task information, arranged in a preset order (e.g., chronological order, etc.), but does not include the creator of the first task information. In some embodiments, the corresponding preset field of the task information can be traced back to the assigner of the previous level, e.g., as described above, the performer variation processes Z-W-V of the corresponding task can be displayed in the corresponding task information of the client of the user W, but the assignment processes from Y to Z cannot be displayed. In general, in a work scenario where the task is assigned from the upper level to the next level, by allowing a user to track only to the upper level and not to the level higher than the upper level, the decision privacy of the upper level supervisor can be protected while also maximizing the tracking management of tasks.

Figure 7:
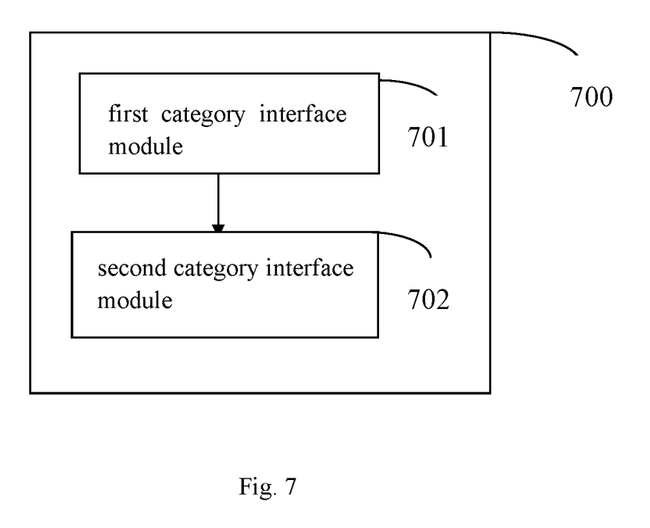
FIG. 7 is a schematic diagram of a part of modules of an information processing apparatus of some embodiments of the present disclosure.

As shown in FIG. 7, an embodiment of the present disclosure further provides an information processing apparatus 700. The information processing apparatus 700 includes a first category interface module 701 and a second category interface module 702. In some embodiments, the first category interface module 701 is configured to to receive first task information at an instant messaging client and display the first task information in a first category interface of a task interface of the instant messaging client. In some embodiments, the second category interface module 702 is configured to display second task information in a second category interface of the task interface of the instant messaging client in response to a preset operation on the first task information, wherein performers of the first task information and the second task information are different.

It should be understood that the contents described with respect to the information processing method are also applicable to the information processing apparatus 700 herein and will not be described in detail herein for the sake of simplicity.

In some embodiments, after displaying the second task information in the second category interface of the task interface of the instant messaging client, the first task information is displayed or no longer displayed in the first category interface. In some embodiments, the preset operation includes an operation of changing content of a preset field of the first task information. In some embodiments, the preset field includes at least one of a performer, an expiration time, note content, a priority level, and a participant. In some embodiments, displaying the second task information in the second category interface of the task interface of the instant messaging client in response to the preset operation on the first task information includes determining content of a preset field of the second task information based on user information performing the preset operation. In some embodiments, displaying the second task information in the second category interface of the task interface of the instant messaging client includes displaying the second task information in a sub-interface of the second category interface. In some embodiments, the second task information includes a creator of the first task information, a creator of the second task information, and a performer of the second task information. In some embodiments, the second task information includes a creator of the first task information, a creator of the second task information, and a performer of the second task information, arranged in a preset order. In some embodiments, the second task information includes a performer of related task information derived from the second task information. In some embodiments, the related task information derived from the second task information includes task information generated through a preset operation on the basis of the second task information. In some embodiments, the second task information includes a performer of the first task information, a performer of the second task information, and a performers of related task information derived from the second task information, but does not include a creator of the first task information.

In addition, the present disclosure also provides a terminal including: at least one memory and at least one processor; wherein the memory is configured to store program code, and the processor is configured to call the program code stored by the memory to perform the above-described information processing method.

In addition, the present disclosure also provides a computer storage medium, which stores program code, the program code, when executed by a processor, cause the processor to perform the above information processing method.

The method and apparatus of the present disclosure are particularly well suited for the case that tasks are distributed layer by layer, and the tracking and management of tasks are facilitated by properly classifying tasks.

Above, the information processing method and apparatus of the present disclosure are explained based on the embodiments and the application examples. In addition, the present disclosure also provides a terminal and a storage medium, which are described below.

Figure 8:
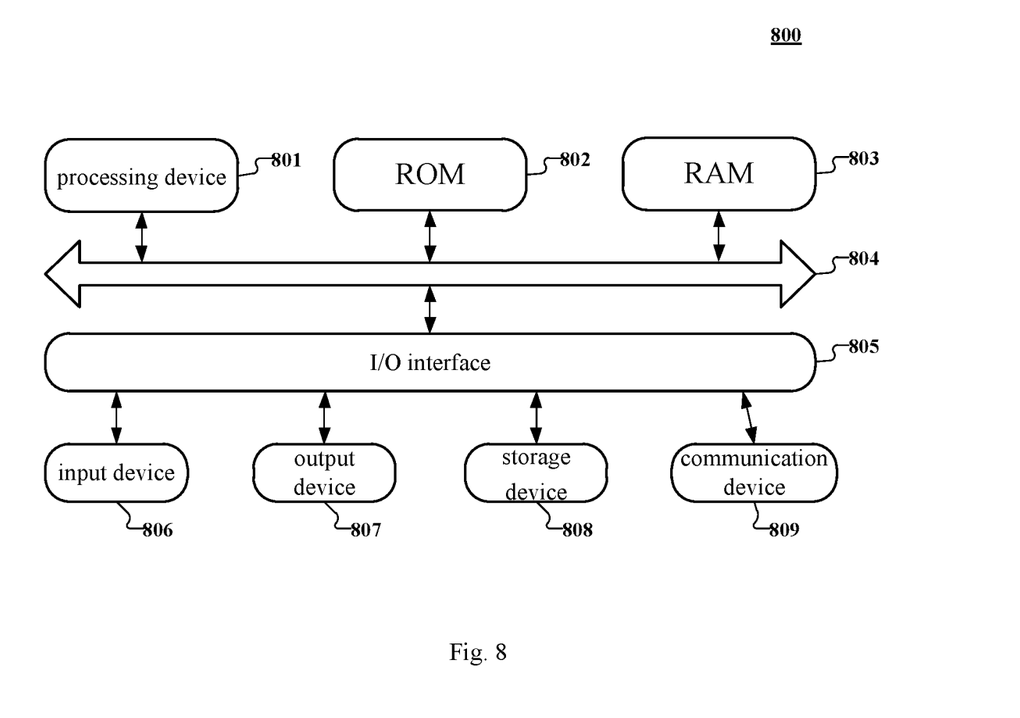
FIG. 8 is a structural schematic diagram of an electronic device of an embodiment of the present disclosure.

Referring to FIG. 8 below, a schematic structural diagram of an electronic device 800 suitable for being used to realize the embodiments of the present disclosure is illustrated. Terminal devices in the embodiments of the present disclosure may include, but are not limited to, mobile terminals such as mobile phones, notebook computers, digital broadcast receivers, personal digital assistants (PDAs), PADs, portable multimedia players (PMPs) and vehicle-mounted terminals (for example, vehicle-mounted navigation terminals), and fixed terminals such as digital TVs and desktop computers. The electronic device shown in FIG. 8 is only an example, and should not bring any limitation to the functions and the scope of use of the embodiments of the present disclosure.

As shown in FIG. 8, the electronic device 800 may include a processing device (e.g., a central processor, a graphics processor, etc.) 801 that may perform a variety of suitable actions and processes in accordance with a program stored in a read-only memory (ROM) 802 or a program loaded from a storage device 808 into a random access memory (RAM) 803. In the RAM 803, various programs and data required for the operation of the electronic device 800 are also stored. The processing device 801, the ROM 802 and the RAM 803 are connected to each other via a bus 804. An input/output (I/O) interface 805 is also connected to the bus 804.

In general, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, magnetic tape, hard disk, etc.; and a communication device 809. The communication device 809 may allow the electronic device 800 to communicate in a wireless or wired manner with other devices to exchange data. Although FIG. 8 illustrates a electronic device 800 having a variety of devices, it should be understood that not all illustrated devices are required to be implemented or provided. More or fewer devices may alternatively be implemented or provided.

Particularly, in accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 809, or installed from the storage device 808, or installed from the ROM 802. When the computer program is executed by the processing device 801, the above-mentioned functions defined in the method of the embodiments of the present disclosure are performed.

It should be noted that the computer storage media described in embodiments of the present disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read only memory (ROM), an erasable programmable read-only memory (EPROM) or flash memory (FLASH), an optical fiber, a compact disc read-only memory (CD-ROM), an optical storage device, a magnetic storage device, or any suitable combination thereof. In the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

In some embodiments, the client and server can communicate with any currently known or future-developed network protocol such as HTTP (HyperText Transfer Protocol), and can communicate (for example, by communication network) with digital data in any form or medium. Examples of communication networks include local area networks ("LAN"), wide area networks ("WAN"), the Internet (for example, the Internet), and end-to-end networks (for example, ad hoc end-to-end networks), as well as any currently known or future-developed network.

The computer-readable medium can be contained in the electronic device; it may also be separate and not assembled into the electronic device.

The storage medium carries one or more program, wherein the program, when executed by a processor, cause the processor to perform the above method of the present disclosure.

Computer program code for carrying out operations of the present disclosure may be written in one or more programming languages, including object-oriented programming languages such as Java, Smalltalk, C++, and conventional procedural programming languages such as the "C" language or similar programming languages. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. Among them, the names of these units do not constitute a limitation on the unit itself under certain circumstances.

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, equipment, or device, or any suitable combination of the foregoing. More specific examples of machine-readable storage media may include electrical connections based on one or more wires, portable computer disks, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, an information processing method is provided, the information processing method comprises: receiving first task information at an instant messaging client, displaying the first task information in a first category interface of a task interface of the instant messaging client; and displaying second task information in a second category interface of the task interface of the instant messaging client in response to a preset operation on the first task information, wherein performers of the first task information and the second task information are different.

According to one or more embodiments of the present disclosure, a log-in user of the instant messaging client is a performer of a task to be performed in the first task information displayed in the first category interface.

According to one or more embodiments of the present disclosure, a log-in user of the instant messaging client is a distributor of a task to be performed in the second task information displayed in the second category interface.

According to one or more embodiments of the present disclosure, after displaying the second task information in the second category interface of the task interface of the instant messaging client, the first task information is displayed or no longer displayed in the first category interface.

According to one or more embodiments of the present disclosure, the preset operation includes an operation of causing content of a preset field of the first task information to be changed.

According to one or more embodiments of the present disclosure, the preset field includes at least one of a performer, an expiration time, note content, a priority level, and a participant.

According to one or more embodiments of the present disclosure, displaying the second task information in the second category interface of the task interface of the instant messaging client in response to the preset operation on the first task information, comprises: determining content of a preset field of the second task information based on information of user performing the preset operation.

According to one or more embodiments of the present disclosure, displaying the second task information in the second category interface of the task interface of the instant messaging client comprises displaying the second task information in a sub-interface of the second category interface.

According to one or more embodiments of the present disclosure, the second task information includes a creator of the first task information, a creator of the second task information and a performer of the second task information.

According to one or more embodiments of the present disclosure, the second task information includes a creator of the first task information, a creator of the second task information and a performer of the second task information, arranged in a preset order.

According to one or more embodiments of the present disclosure, the second task information includes a performer of related task information derived from the second task information.

According to one or more embodiments of the present disclosure, the related task information derived from the second task information includes task information generated through a preset operation on the basis of the second task information.

According to one or more embodiments of the present disclosure, the second task information includes a performer of the first task information, a performer of the second task information, and a performer of related task information derived from the second task information, and excludes a creator of the first task information.

According to one or more embodiments of the present disclosure, when a user performing a preset operation makes a change to a preset field of the first task information, a preset field of the generated second task information undergoes a corresponding change.

According to one or more embodiments of the present disclosure, an information processing method is provided, the information processing method comprises: receiving first task information at an instant messaging client, displaying the first task information in a task interface of the instant messaging client; and displaying second task information in the task interface of the instant messaging client in response to a preset operation on the first task information, wherein performers of the first task information and the second task information are different, and the second task information includes a performer of a corresponding task and a performer of related task information derived from the second task information.

According to one or more embodiments of the present disclosure, an information processing method is provided, the information processing method comprises: receiving first task information; and generating second task information in response to a preset operation on the first task information; wherein the second task information includes a performer of the first task information, a performer of the second task information, and a performer of related task information derived from the second task information, arranged in a preset order, and excludes a creator of the first task information.

According to one or more embodiments of the present disclosure, an information processing apparatus is provided, the information processing apparatus comprises: a first category interface module configured to receive first task information at an instant messaging client and display the first task information in a first category interface of a task interface of the instant messaging client; and a second category interface module configured to display second task information in a second category interface of the task interface of the instant messaging client in response to a preset operation on the first task information, wherein performers of the first task information and the second task information are different.

According to one or more embodiments of the present disclosure, a terminal device is provided, the terminal device comprises: at least one memory and at least one processor; wherein the at least one memory is configured to store program code, and the at least one processor is configured to call the program code stored by the at least one memory to perform the above information processing method.

According to one or more embodiments of the present disclosure, a storage medium for storing program code is provided, the program code, when executed by a processor, cause the processor to perform the above information processing method.

The above description is only a preferred embodiment of the present disclosure and an explanation of the applied technical principles. Those skilled in the art should understand that the scope of disclosure involved in this disclosure is not limited to the technical solutions formed by the specific combination of the above technical features, and should also cover other combinations formed by the above technical features or their equivalent features. Technical solutions. For example, the above-mentioned features and the technical features disclosed in the present disclosure (but not limited to) having similar functions are replaced with each other to form a technical solution.

In addition, although the operations are depicted in a specific order, this should not be understood as requiring these operations to be performed in the specific order shown or performed in a sequential order. Under certain circumstances, multi-task and parallel processing may be advantageous. Likewise, although several specific implementation details are included in the above discussion, these should not be construed as limiting the scope of the present disclosure.

Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An information processing method, comprising:
receiving first task information at an instant messaging client, displaying the first task information in a first category interface of a task interface of the instant messaging client, wherein the first task information comprises information indicative of assigning a task to a first user from a creator of the task;
receiving an operation performed on the first task information in the first category interface, wherein the operation is indicative of assigning the task to a second user from the first user;
generating and displaying second task information indicative of a creation and execution history of the task in a second category interface of the task interface of the instant messaging client in response to receiving the operation performed on the first task information, wherein the second task information comprises information indicative of the creator of the task, information indicative of the first user, and information indicative of the second user;
displaying the information indicative of the creator, the information indicative of the first user, and the information indicative of the second user in a chronological order;
causing to send a report to the creator in response to determining that the task has been assigned from the first user to the second user, wherein the report indicates that a performer of the task has been changed from the first user to the second user; and
wherein a third category interface is generated when the task is assigned from the second user to a third user, and the third category interface does not display the information indicative of the creator to avoid information leakage.

2. The information processing method according to claim 1, wherein a log-in user of the instant messaging client is a performer of a task to be performed in the first task information displayed in the first category interface.

3. The information processing method according to claim 1, wherein a log-in user of the instant messaging client is a distributor of a task to be performed in the second task information displayed in the second category interface.

4. The information processing method according to claim 1, wherein after displaying the second task information in the second category interface of the task interface of the instant messaging client, the first task information is displayed or no longer displayed in the first category interface.

5. The information processing method according to claim 1, wherein the first task information comprises a preset field, and the preset field includes at least one of a performer, an expiration time, note content, a priority level, and a participant.

6. The information processing method according to claim 1, wherein, displaying the second task information in the second category interface of the task interface of the instant messaging client in response to receiving the operation performed on the first task information, comprises:
determining content of a preset field of the second task information based on information of user performing the operation.

7. The information processing method according to claim 1, wherein displaying the second task information in the second category interface of the task interface of the instant messaging client comprises displaying the second task information in a sub-interface of the second category interface.

8. The information processing method according to claim 1, wherein the second task information includes a creator of the first task information, a creator of the second task information and a performer of the second task information.

9. The information processing method according to claim 8, wherein the second task information includes a creator of the first task information, a creator of the second task information and a performer of the second task information, arranged in a preset order.

10. The information processing method according to claim 1, wherein the second task information includes a performer of related task information derived from the second task information.

11. The information processing method according to claim 10, wherein the related task information derived from the second task information includes task information generated through a preset operation on the basis of the second task information.

12. The information processing method according to claim 1, wherein the second task information includes a performer of the first task information, a performer of the second task information, and a performer of related task information derived from the second task information, and excludes a creator of the first task information.

13. The information processing method according to claim 1, wherein when a user performing a preset operation makes a change to a preset field of the first task information, a preset field of the generated second task information undergoes a corresponding change.

14. An information processing method, comprising:
receiving first task information, wherein the first task information comprises information indicative of a first user assigning a task to a second user, and wherein the task was assigned to the first user by a creator of the task;
receiving an operation performed on the first task information, wherein the operation is indicative of assigning the task to a third user from the second user;
generating and displaying second task information in an interface in response to receiving the operation performed on the first task information, wherein the second task information includes information indicative of the first user, information indicative of the second user, and information indicative of the third user;
displaying the information indicative of the first user, the information indicative of the second user, and the information indicative of the third user in chronological order, wherein the interface does not display information indicative of the creator of the task; and causing to send reports to the first user and the creator in response to determining that the task has been assigned from the second user to the third user, wherein the reports indicate that a performer of the task has been changed from the second user to the third user.

15. A non-transitory computer-readable storage medium for storing program code, wherein the program code, when executed by a processor, causes the processor to perform operations comprising:

receiving first task information at an instant messaging client, displaying the first task information in a first category interface of a task interface of the instant messaging client, wherein the first task information comprises information indicative of assigning a task to a first user from a creator of the task;

receiving an operation performed on the first task information in the first category interface, wherein the operation is indicative of assigning the task to a second user from the first user;

generating and displaying second task information indicative of a creation and execution history of the task in a second category interface of the task interface of the instant messaging client in response to receiving the operation performed on the first task information, wherein the second task information comprises information indicative of the creator of the task, information indicative of the first user, and information indicative of the second user;

displaying the information indicative of the creator, the information indicative of the first user, and the information indicative of the second user in a chronological order;

causing to send a report to the creator in response to determining that the task has been assigned from the first user to the second user, wherein the report indicates that a performer of the task has been changed from the first user to the second user; and wherein a third category interface is generated when the task is assigned from the second user to a third user, and the third category interface does not display the information indicative of the creator to avoid information leakage.

16. The non-transitory computer-readable storage medium according to claim 15, wherein a log-in user of the instant messaging client is a performer of a task to be performed in the first task information displayed in the first category interface.

17. The non-transitory computer-readable storage medium according to claim 15, wherein a log-in user of the instant messaging client is a distributor of a task to be performed in the second task information displayed in the second category interface.

18. The non-transitory computer-readable storage medium according to claim 15, wherein after displaying the second task information in the second category interface of the task interface of the instant messaging client, the first task information is displayed or no longer displayed in the first category interface.

19. The non-transitory computer-readable storage medium according to claim 15, wherein the operation includes an operation of causing content of a preset field of the first task information to be changed.

* * * * *